DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 28, 1970

876 O.G. 816

T876,005

FIRE RETARDATION COMPOSITION FOR USE IN LATEX FORMULATIONS FOR JUTE CARPET BACKING

Lewis C. Trent, Rte. 11, Lochridge, Kingsport, Tenn. 37663

Filed Jan. 19, 1970, Ser. No. 4,029
Int. Cl. C09k *3/28*
U.S. Cl. 252—8.1
No Drawing. 9 Pages Specification

Compositions for fire-retardant treatment of woven jute carpet primary backing materials comprising a carpet latex formulation having therein a fire-retardant composition comprising a mixture of an alkali metal borate and an alkali metal salt of phosphoric acid. A particularly effective fire-retardant composition in a carpet latex formulation is a mixture of 38% sodium tetraborate; 11% monosodium phosphate; 14% boric acid; 25% ammonium tetraborate; and 12% water; the mixture being present in the amount of 5–15% of the weight of solids in the latex formulation.